2,845,401
UREAFORM FERTILIZER

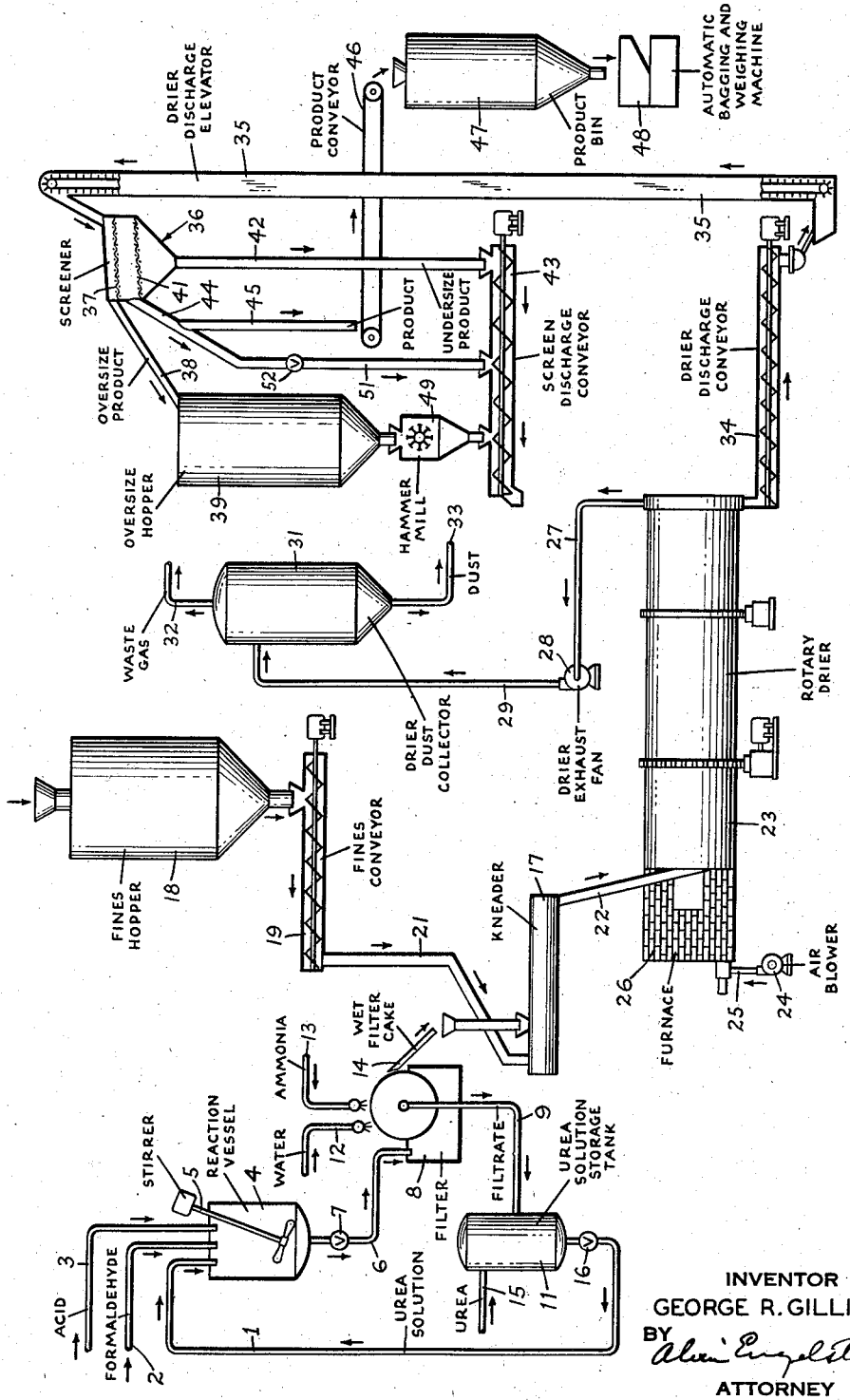

George R. Gilliam, Prince George, Va., assignor to Allied Chemical Corporation, a corporation of New York Application February 28, 1955, Serial No. 491,111

4 Claims. (Cl. 260—71)

This invention relates to ureaform fertilizer and more particularly refers to a process for the production of pelletized urea-formaldehyde fertilizer of high bulk density.

Ureaform fertilizers consisting of a solid reaction product of urea and formaldehyde containing water-insoluble nitrogen and methods for producing them are known in the art as exemplified by U. S. Patent 2,415.705, issued February 11, 1947, to Leonard V. Rohner and Alvin P. Wood, and U. S. Patent 2,644,806, issued July 7, 1953, to Mearl A. Kise. Such processes for the production of the ureaform fertilizers generally involve reacting urea and formaldehyde in an aqueous solution to precipitate an insoluble urea-formaldehyde reaction product from the solution and thereafter separating the precipitate as by filtration and drying the precipitate to a low moisture content. The ureaform product produced by the prior art processes is an excellent fertilizer but unfortunately in these processes the filter cake on drying tends to break easily into powdery particles and the product has a low bulk density of about 18 lbs./ft.³. This fine powder is difficult to handle as a fertilizer and the low bulk density of the material results in need for excessive storage space both in bulk and in bags.

A primary object of the present invention is to provide a new and improved process for the production of pelletized urea-formaldehyde fertilizer of high bulk density, about 36–46 lbs./ft.³.

Other objects and advantages of the present invention will be apparent from the following description and accompanying drawing.

In the first part of the operation for producing the high bulk density urea-formaldehyde fertilizer of the present invention, urea and formaldehyde in aqueous solution are reacted to precipitate an insoluble urea-formaldehyde reaction product from solution and the precipitate separated by filtration. The present invention departs from conventional treatment of the resultant filter cake as disclosed in Patents 2,415,705 and 2,644,806 with consequent production of a powdery low bulk density fertilizer and instead employs a different method of operation as hereinafter described resulting in the production of a pelletized ureaform fertilizer of high bulk density.

In accordance with the present operation, the wet filter cake produced by reacting urea and formaldehyde and filtering the resultant precipitate as described above, containing about 55–85% H₂O, generally 65–85% H₂O by weight of the total wet filter cake, is kneaded with sufficient dried ureaform fertilizer containing about 1–5% by weight water to produce a practically uniform mass containing 15–24%, preferably 18–24% H₂O. The kneaded mixture is then passed through a rotary drier in contact with hot drying gas maintained at a temperature between 160–330° C., preferably between 220–320° C. and regulated so that the kneaded mixture undergoing drying does not exceed the temperature of 110° C., preferably 90–105° C. The dried product containing 1–5% H₂O, preferably 2–4% H₂O, is screened to separate a pelletized product of 6–48 mesh size, preferably 14–48 mesh size and the undersize and oversize (after crushing) dried product is accumulated and subsequently employed for admixture with wet filter cake.

The accompanying drawing is a diagrammatic flow sheet illustrating one method of practicing the present invention.

Referring to the drawing, the feed materials to the system are an aqueous urea solution entering through line 1; formaldehyde, usually in aqueous solution such as formalin entering through line 2; and an acid such as nitric acid entering through line 3 to adjust the pH of the reaction mixture. Reaction vessel 4 is a typical cylindrical open top stainless steel vessel equipped with a variable speed agitator 5. The reaction in vessel 4 is continued with agitation to produce a precipitate of urea-formaldehyde, usually requiring about 15–45 minutes. The concentration of the reactants in the reaction mixture in vessel 4 is normally within the range of 15–20%. The reaction variables are temperature, acidity, reaction time, reactant concentration and mol ratio, and degree of agitation and may be varied within wide limits as fully described in Patents 2,415,705 and 2,644,806.

The reacted slurry is withdrawn from the bottom of reaction vessel 4 through line 6 and valve 7 and fed to filter 8 which may be any suitable rotary drum filter. The mother liquor is withdrawn from filter 8 through line 9 and sent to urea solutions storage tank 11. The filter cake is washed first with water entering through line 12 and then with a dilute aqueous ammonia solution entering through line 13 to neutralize the nitric acid, yielding a neutral or slightly alkaline filter cake discharging through chute 14. The wash waters entering through lines 12 and 13 also flow through line 9 into storage tank 11. Urea is added through line 15 to urea solutions storage tank 11 in the required amount to make an aqueous urea solution of the desired concentration which then flows from the bottom of tank 11, valve 16 and line 1 into reaction vessel 4. Additional make-up water for the process as needed may be added through line 3. The operation thus far described for producing insoluble urea-formaldehyde wet filter cake for use as fertilizer is conventional and disclosed in the art. Moist filter cake containing 55–85% by weight, usually 65–85% by weight, water enters kneader 17 wherein it is kneaded with dried ureaform descending from fines hopper 18, fines conveyor 19 and conduit 21 to produce a practically uniform mass containing 15–24% moisture. Generally the quantity of dried ureaform required to reduce the wet filter cake to the proper water content will be in the proportion of about 2.5–4.5 parts dried ureaform for each part of wet filter cake. To accomplish the marked increase in bulk density it is important that this mixing is conducted as a kneading operation involving working and pressing the mass. Simple mixing as by tumbling is not adequate. Conventional equipment that furnishes the required kneading action includes sigma arm mixers, pug mills, and screw type mixers. The water content of the mixture of filter cake and dried ureaform is also important for success of the granular operation. The departure from the narrow range of 15–24% H₂O, preferably 18–24% H₂O, in the mixture tends to give poor granulation or sticking or both in a drier wherein the mixture is heated to reduce its water content. The dried ureaform in hopper 18 is a product produced by an earlier operation and has a water content of about 1–5% and a particle size desirably below 48 mesh size.

The kneaded mixture from kneader 17 is fed through conduit 22 into conventional direct fired rotary showering drum type drier 23 wherein the ureaform mixture is heated by an air stream forced by air blower 24 through line 25 into furnace 26. The ureaform product is heat sensitive and drying gas is preferably fed to rotary drier 23 concurrently with the damp ureaform. The temperature of the inlet drying gas is controlled so that the product temperature never exceeds 110° C., preferably 90–105° C. Higher product temperatures tend to destroy the nitrogen-activity of the product and may result in loss of total nitrogen. Therefore, the inlet gas temperature to the drier should not exceed 330° C. and should in all events be dropped to a temperature sufficiently low to maintain the temperature of the product at the exit of the drier below 110° C. In practice good results are obtained by maintaining the inlet gas temperature to the drier between 160–330° C., preferably 210–320° C. and the product temperature at the exit of the drier between 75–110° C., preferably within the range of 90–105° C. Exhaust gas ladened with dust particles of ureaform is released from drier 23 through line 27 and sent by drier exhaust fan 28 through line 29 into drier dust collector 31 which may take the form of a conventional cyclone separator for separation of the solid dust particles from the gases. The waste gases are released through line 32 from the top of collector 31 and may be discharged to the atmosphere. The ureaform dust particles accumulating in the bottom of collector 31 are discharged through line 33 and may be sent to fines hopper 18 for mixing and kneading with a batch of wet ureaform filter cake.

Dried ureaform product containing 1–5% by weight water is transported from rotary drier 23 by means of conveyor 34 to drier discharge elevator 35 into screener 36. Oversize particles of ureaform, i. e. particles greater than about 6–14 mesh size, will not pass through upper inclined screen 37 and discharge therefrom through conduit 38 into oversize hopper 39. Undersize particles of dried ureaform, below about 48 mesh size, pass through lower screen 41 and discharge through conduit 42 and to screen discharge conveyor 43 from whence they may be sent to fines hopper 18 for admixture and kneading with moist filter cake discharging from chute 14. Dried ureaform of the desired size of about 6–48 mesh size, preferably 14–48 mesh size, discharges through conduits 44 and 45 onto product conveyor 46, thence to product bin 47 and finally to conventional automatic packing and weighing machine 48. The dried pelletized or granular product has a bulk density of 36–46 lbs./ft.$^3$, more commonly within the range of 40–46 lbs./ft.$^3$ and a nitrogen activity by A. O. A. C. test of over 80%, usually over 90%. The oversize product in hopper 39 discharges into conventional hammer mill 49 and the comminuted dried ureaform then directed onto conveyor 43. Generally the oversize and undersize dried ureaform products are inadequate in amount for mixing and kneading with the wet filter cake, and therefore a portion of the product discharging through line 44 is diverted down through line 51 and valve 52 onto conveyor 43 to be directed to hopper 18.

The following example illustrates the present invention. 28,000 lbs. of an aqueous solution containing 15% by weight urea and 1,750 lbs. of 37% aqueous formaldehyde are charged into a reaction vessel equipped with stirrer and sufficient nitric acid added to bring the pH of the mixture to 1.4. The reaction mixture is maintained with agitation at a temperature of about 30° C. for about ½ hour resulting in the precipitation of urea-formaldehyde reaction product from the solution. The reaction slurry is filtered and washed with water and ammonia to neutralize the nitric acid. 11,000 lbs. of wet filter cake having a water content 76% by weight are recovered and sent to a pug mill wherein it is admixed and kneaded with 28,000 lbs. of finely divided dried ureaform smaller than 48 mesh size and having a water content of 3% by weight. The thoroughly kneaded mixture of filter cake and dried ureaform contains 23.6% by weight water. The kneaded mixture is then dried by passing it through a rotary drier concurrently with hot air at an initial temperature of 285° C. in sufficient volume to raise the temperature of the product to 96° C. at the discharge end of the rotary drier. The dried ureafrom product is screened to separate oversize and undersize particles which may be returned for blending with additional moist filter cake leaving ureaform of 14–48 mesh size having moisture content of 3.1%, a bulk density of 42 lbs./ft.$^3$ and a nitrogen-activity by A. O. A. C. test of over 90%. The A. O. A. C. test referred to herein is that of "Official and Tentative Methods of Analyses" of the A. O. A. C., pages 29 and 30 (sixth edition, 1945).

Although certain preferred embodiments of the invention have been disclosed for purpose of illustration it will be evident that various changes and modifications may be made therein without departing from the scope and spirit of the invention.

I claim:

1. In a process for the production of pelletized urea-formaldehyde fertilizer of high bulk density of 36–46 lbs./ft.$^3$ involving reacting urea and formaldehyde as the sole reactants in aqueous solution to precipitate from the solution a reaction product of urea and formaldehyde containing water-insoluble nitrogen having a high activity for use as a fertilizer followed by separating the precipitate from the solution to produce a wet cake containing 55–85% by weight water which on drying tends to break easily into a powdery mass of low bulk density, the improvement which comprises admixing the wet cake with about 2.5–4.5 its weight of dried urea-formaldehyde product previously produced in the process and having a particle size below 48 mesh size to produce a mixture containing 15–24% by weight water, kneading and pressing said mixture of wet cake and dried urea-formaldehyde fertilizer until a uniform mass is produced, and heating said uniform mass by contact with heated drying gas in a rotary drier to drying temperature not in excess of 110° C. to produce a dry pelletized product having a bulk density of 36–46 lbs./ft.$^3$.

2. In a process for the production of pelletized urea-formaldehyde fertilizer of high bulk density of 36–46 lbs./ft.$^3$ involving reacting urea and formaldehyde as the sole reactants in aqueous solution to precipitate from the solution a reaction product of urea and formaldehyde containing water-insoluble nitrogen having a high activity for use as a fertilizer followed by separating the precipitate from the solution to produce a wet cake containing 55–85% by weight $H_2O$, the improvement which comprises admixing the wet cake with about 2.5–4.5 its weight of dried urea-formaldehyde fertilizer previously produced in the process and having a particle size within the range of 6–48 mesh size and containing about 1–5% water to produce a mixture containing 15–24% by weight water, kneading said mixture of wet cake and dried urea-formaldehyde fertilizer to produce a uniform mass, heating the kneaded mixture in a rotary drier to a temperature not in excess of 110° C. to produce a pelletized product containing between 1–5% by weight water, and then screening the dried urea-formaldehyde product to separate a pelletized urea-formaldehyde fertilizer having a mesh size within the range of 6–48, a nitrogen activity by A. O. A. C. test of over 80% and a bulk density of 36–46 lbs./ft.$^3$.

3. In a process for the production of pelletized urea-formaldehyde fertilizer of high bulk density of 36–46 lbs./ft.$^3$ involving reacting urea and formaldehyde as the sole reactants in aqueous solution to precipitate from the solution a reaction product of urea and formaldehyde containing water-insoluble nitrogen having a high activity for use as a fertilizer followed by separating the precipitate from the solution to produce a wet cake containing 55–85% by weight $H_2O$, the improvement which comprises admixing the wet cake with about 2.5–4.5 its weight of dried urea-formaldehyde fertilizer previously produced in the process and having a particle size within the range of 6-48 mesh size and containing about 1-5% water to produce a mixture containing 15-24% by weight water, kneading said mixture of wet cake and dried urea-formaldehyde fertilizer to produce a uniform mass, heating the kneaded mixture in a rotary drier to a temperature not in excess of 110° C. to produce a pelletized product containing between 1-5% by weight water, screening the dried urea-formaldehyde product to separate from oversize and undersize particles, a pelletized urea-formaldehyde fertilizer having a mesh size within the range of 6-48, a nitrogen activity by A. O. A. C. test of over 80% and a bulk density of 36-46 lbs./ft.$^3$, and returning the oversize and undersize particles for kneading with additional wet filter cake.

4. In a process for the production of pelletized urea-formaldehyde fertilizer of high bulk density of 40-46 lbs./ft.$^3$ involving reacting urea and formaldehyde as the sole reactants in aqueous solution to precipitate from the solution a reaction product of urea and formaldehyde containing water-insoluble nitrogen having a high activity for use as a fertilizer followed by filtering the precipitate from the solution to produce a wet filter cake containing 65-85% by weight H$_2$O, the improvement which comprises admixing the wet filter cake with about 2.5-4.5 its weight of dried urea-formaldehyde fertilizer previously produced in the process and having a particle size within the range of 14-48 mesh size and containing about 1-5% water to produce a mixture containing 18-24% by weight water, kneading said mixture of wet filter cake and dried urea-formaldehyde fertilizer to produce a uniform mass, heating the kneaded mixture in a rotary drier to a temperature within the range of 90-105° C. to produce a pelletized product containing between 2-4% by weight water, and then screening the dried urea formaldeweight water, and then screening the dried urea-formalde-fertilizer having a mesh size within the range of 14-48, a nitrogen activity by A. O. A. C. test of over 90% and a bulk density of 40-46 lbs./ft.$^3$.

References Cited in the file of this patent

UNITED STATES PATENTS

| | | |
|---|---|---|
| 2,287,759 | Hardesty et al. | June 23, 1942 |
| 2,415,705 | Rohner | Feb. 11, 1947 |
| 2,448,126 | Shoeld | Aug. 31, 1948 |
| 2,592,809 | Kralovec et al. | Apr. 15, 1952 |
| 2,644,806 | Kise | July 7, 1953 |

UNITED STATES PATENT OFFICE
CERTIFICATE OF CORRECTION

Patent No. 2,845,401                                    July 29, 1958

George R. Gilliam

It is hereby certified that error appears in the printed specification of the above numbered patent requiring correction and that the said Letters Patent should read as corrected below.

Column 6, line 12, strike out "weight water, and then screening the dried urea-formalde-" and insert instead -- hyde product to separate a pelletized urea-formaldehyde --.

Signed and sealed this 21st day of October 1958.

(SEAL)

Attest:

KARL H. AXLINE
Attesting Officer

ROBERT C. WATSON
Commissioner of Patents